(12) United States Patent
Lee et al.

(10) Patent No.: US 8,948,202 B2
(45) Date of Patent: Feb. 3, 2015

(54) METHOD AND AN APPARATUS FOR TRANSMITTING MESSAGES IN HOME NETWORK SYSTEM

(75) Inventors: Min Soo Lee, Seoul (KR); Jin Ho Kim, Seoul (KR); Beom Jin Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 228 days.

(21) Appl. No.: 13/580,306

(22) PCT Filed: Feb. 23, 2011

(86) PCT No.: PCT/KR2011/001211
§ 371 (c)(1),
(2), (4) Date: Aug. 21, 2012

(87) PCT Pub. No.: WO2011/105770
PCT Pub. Date: Sep. 1, 2011

(65) Prior Publication Data
US 2012/0314720 A1    Dec. 13, 2012

Related U.S. Application Data

(60) Provisional application No. 61/306,953, filed on Feb. 23, 2010.

(51) Int. Cl.
 *H04J 3/16*  (2006.01)
 *H04J 3/22*  (2006.01)
 *H04L 12/28*  (2006.01)
 *H04J 3/00*  (2006.01)

(52) U.S. Cl.
 CPC ..... *H04L 12/2838* (2013.01); *H04L 2012/2849* (2013.01)
 USPC .......................................... 370/467; 370/476

(58) Field of Classification Search
 CPC ........... H04L 12/2838; G09G 2370/12; H04N 21/43635; H04N 5/765
 USPC .................. 370/389–394, 465–467, 469, 476; 348/441, 460
 See application file for complete search history.

(56) References Cited

U.S. PATENT DOCUMENTS 4,782,498 A * 11/1988 Copeland, III ................ 375/222
7,953,108 B2 * 5/2011 Polland et al. ................ 370/466
2006/0092893 A1 * 5/2006 Champion et al. ............ 370/338

(Continued)

FOREIGN PATENT DOCUMENTS

CN     101466032 A    6/2009
EP     2073436        6/2009

*Primary Examiner* — Xavier Szewai Wong
(74) *Attorney, Agent, or Firm* — McKenna Long & Aldridge LLP (57) ABSTRACT

Relating to a home network system and a home entertainment system, a method and an apparatus for transmitting packets in a home network system and a home entertainment system are disclosed. Additionally, a method for identifying devices to which the packets are to be transmitted and an apparatus for supporting the same are also disclosed herein. According to an embodiment, a method for transmitting a packet in a high definition base transmission (hereinafter referred to as HDBaseT) system includes the steps of receiving data from a source device in a transmission adaptor, converting the received data from the transmission adaptor to a downstream packet, in order to transmit the converted downstream packet to a receiving adaptor through an HDBaseT network, and transmitting the converted downstream packet to the receiving adaptor. At this point, the downstream packet may include a hierarchical identifier for identifying HDBaseT entities to which the downstream packet is to be transmitted.

18 Claims, 8 Drawing Sheets

(56) References Cited

U.S. PATENT DOCUMENTS

| | | | |
|---|---|---|---|
| 2009/0022176 A1* | 1/2009 | Nguyen | 370/466 |
| 2009/0083374 A1 | 3/2009 | Saint Clair | |
| 2009/0109332 A1* | 4/2009 | Lin | 348/441 |
| 2009/0248918 A1 | 10/2009 | Diab et al. | |
| 2009/0276515 A1 | 11/2009 | Thomas et al. | |
| 2010/0061242 A1* | 3/2010 | Sindhu et al. | 370/235 |

* cited by examiner

METHOD AND AN APPARATUS FOR TRANSMITTING MESSAGES IN HOME NETWORK SYSTEM

This Application is a 35 U.S.C. §371 National Stage Entry of International Application No. PCT/KR2011/001211, filed Feb. 23, 2011 and claims the benefit of U.S. Provisional Application No. 61/306,953, filed Feb. 23, 2010, all of which are incorporated by reference in their entirety herein.

TECHNICAL FIELD

The present invention relates to a home network system and a home entertainment system and, more particularly, to a method and an apparatus for transmitting messages in a home network system and a home entertainment system. The present invention also relates to a method for identifying devices to which and from which the corresponding messages are to be received and transmitted and a device for supporting this method.

BACKGROUND ART

The present invention relates to a HDBaseT (High Definition Base T) technology.

An extensive number of cables are required for using television receivers (TVs), personal computers (PCs), and audio systems that are presently most frequently used in households and offices.

Among the HD (High Definition) transmission cable technologies that are presently most widely used, some of the technologies are limited in the transmission rate and also limited in the transmission capacity. Therefore, such limitation leads to a problem of not being capable of processing contents at a fast rate, wherein the size of the contents is constantly increasing. Also, since the current HD transmission technology does not support uncompressed video, it is difficult to connect multiple video devices to one another in case the devices are spaced apart from one another at a distance of a few meters. Furthermore, it is also difficult to provide HD multimedia integrated contents throughout the entire household and/or office.

Additionally, since HD TV cables, audio cables, video cables, Internet LAN cable, power supply cables, and so on are separately provided for each of the conventional electrical devices, there lies a problem in that the wiring (or lining) is complicated and does not provide a pleasant appearance.

Among the cables that are currently used, the HDMI (High Definition Multimedia Interface) cable is most widely used. Since the HDMI cable uses an uncompressed transmission method, the equipment of a decoder or a decoding software, which corresponds to the compression domain (or area), is not required. Furthermore, in case of using the HDMI technology, since signals, such as video signals, audio signals, and/or control signals, may be transmitted through a single cable by using a format integrated to a single digital interface, the HDMI technology is advantageous in that the complex wiring [or lining] for connecting the conventional AV (Audio/Video) devices can be simplified.

However, the HDMI technology is disadvantageous in that only uni-directional (or one-way) services from a multimedia source device to a display device are available, and that only a maximum cable length of 15 meters can be supported. Furthermore, when using the HDMI technology, it is difficult to efficiently support an environment where a plurality of multimedia sources is supported simultaneously. For example, since the HDMI technology is incapable of supporting USB, networking, a Daisy Chain method of a serial connection method, and so on, there are limitations in the adoption (or usage) of the HDMI technology.

DISCLOSURE OF INVENTION

Technical Problem

The HDBaseT technology that is disclosed in the present invention relates to providing the transmission of uncompressed high definition (or high picture quality) video and audio via an Ethernet of 100 Mbps and a CAT5/6 (Category 5/6) cable based 100 Mbps Ethernet through a single cable.

Additionally, the HDBaseT technology may also be used in home theaters, DVRs (Digital Video Recorders), BDP (Blu-ray Disc Players), gaming devices, PCs (Personal Computers), and/or mobile products, and the HDBaseT technology may be connected to multiple displays so as to configure a multi screen.

Furthermore, the HDBaseT technology may also provide bi-directional (or two-way) communication, transmission of multiple streams, and power transmission through a single cable.

However, in case of the HDBaseT technology, since a plurality of entities is used, a method for efficiently identifying and referring to such entities from each connection node should be researched and provided.

Therefore, an object of the present invention is to provide an efficient communication method used in a home network system and an apparatus for supporting the same.

Another object of the present invention is to provide a method for accurately identifying each entity within the home network system and an apparatus for supporting the same.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Solution to Problem

Also, the present invention discloses various methods for transmitting a packet and apparatuses for supporting the same.

According to an embodiment, a method for transmitting a packet in a high definition base transmission (hereinafter referred to as HDBaseT) system includes the steps of receiving data from a source device in a transmission adaptor, converting the received data from the transmission adaptor to a downstream packet, in order to transmit the converted downstream packet to a reception adaptor through an HDBaseT network, and transmitting the converted downstream packet to the reception adaptor. At this point, the downstream packet may include a hierarchical identifier for identifying HDBaseT entities to which the downstream packet is to be transmitted.

According to another embodiment of the present invention, a device for transmitting a packet in a high definition base transmission (HDBaseT) system includes one or more ports configured to receive data from a source device, an HDMI-AV packetizer configured to convert high definition multimedia interface(HDMI) data to an HDMI packet that is to be transmitted from the HDBaseT system, an Ethernet packetizer configured to convert Ethernet data to an Ethernet packet that is to be transmitted from the HDBaseT system, a USB packetizer configured to convert USB (Universal Serial Bus) data to a USB packet that is to be transmitted from the HDBaseT system, a downstream link scheduler configured to control a transmission order of the HDMI packet, the Ethernet packet, and the USB packet, and a transmitter configured to transmit the packets based upon a control of the downstream link scheduler. At this point, the one or more ports may include one or more HDMI ports for receiving the HDMI data, one or more Ethernet ports for receiving the Ethernet data, and one or more USB ports for receiving the USB data.

The transmission adaptor may receive data from the source device through the one or more ports, and, in order to transmit the received data to the reception adaptor through an HDBaseT network, the transmission adaptor may use at least one of the HDMI-AV packetizer, the Ethernet packetizer, and the USB packetizer, so as to convert the data to a downstream, and the transmission adaptor may transmit the converted downstream to the reception adaptor via the transmitter. At this point, the downstream packet may include a hierarchical identifier for identifying HDBaseT entities to which the downstream packet is to be transmitted.

In the embodiments of the present invention, the hierarchical identifier may include a device medium access control (MAC) address field for identifying a device management entity of an HDBaseT device, a port identifier field for identifying one or more ports associated with the HDBaseT device, a T group identifier field for identifying one or more HDBaseT groups associated with the one or more ports, and a type mask field for identifying one or more adaptor associated with the one or more HDBaseT groups.

At this point, the type mask field may indicate at least one of a high definition multimedia interface (HDMI) source, an HDMI sink, an S/PDIF (Sony/Philips Digital Interconnect Format) source, an S/PDIF sink, a USB (Universal Serial Bus) host, a USB device, an IR TX (Infra-Red Transmitter), an IR RX (Infra-Red Receiver), a UART (Universal Asynchronous Receiver/Transmitter), and an extension bit.

When the extension bit is set up, the hierarchical identifier may be indicated to include two or more type mask fields.

The port identifier field and the T group identifier field may be combined so as to be collectively used to identify a specific T group entity. If the T group identifier field is set to '0', the one or more ports may be uniquely identified.

The device management entity may correspond to one of a port device management entity (PDME), a switching device management entity (SDME), and a control point management entity (CPME).

According to another aspect of the present invention, the hierarchical identifier may include at least one of a device identifier (Device ID) for identifying a management entity of the reception adaptor, a port identifier (Port ID) for identifying a port device of the reception adaptor, a group identifier (T-Group ID) for identifying an HDBaseT group (T-Group) to which the reception adaptor belongs, and a type field mask for identifying the reception adaptor belonging to the identified T-group.

The transmission adaptor may perform a source device discovery procedure for discovering the source device. At this point, the port identifier field and the T group identifier field may be combined so as to identify a specific T group entity.

The above-described embodiments of the present invention are merely a portion of the preferred embodiments of the present invention. And, it is to be understood that both the foregoing general description and the following detailed description of the present invention are exemplary and explanatory and are intended to provide further explanation of the invention as claimed.

Advantageous Effects of Invention

According to the embodiments of the present invention, the present invention has the following advantages.

First of all, by using a single cable, the HDBaseT technology disclosed in the present invention may perform transmission of high definition (or high picture quality) video/audio, transmission and reception of 3D images, data communication (Internet), power supply, and/or various control signal transmission. Therefore, only a single cable may be used instead of a large number of cables.

Secondly, by simultaneously supplying uncompressed HD multimedia contents and data, control signals, and power to multiple rooms through a single cable, the HDBaseT technology may enhance user convenience.

Thirdly, a plurality of entities used in the HDBaseT technology may be effectively identified and referred to.

Finally, by using the apparatuses and methods disclosed in the present invention, the home network system may be capable of using the corresponding contents more efficiently.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

MODE FOR THE INVENTION

The embodiment of the present invention relates to an HDBaseT system, wherein a reference method for identifying the devices, entities, and elements used in the HDBaseT system and apparatuses for supporting the reference method are disclosed.

The embodiments described below correspond to predetermined combinations of elements and features and characteristics of the present invention. Moreover, unless mentioned otherwise, each element or characteristic of the present invention may be considered as an optional feature of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In order to avoid any ambiguity in the concept (or idea) of the present invention, some of the structures and devices disclosed (or mentioned) in the present invention may be omitted from the description of the accompanying drawings of the present invention. Also, any procedure or step that can be easily understood by anyone skilled in the art has also been excluded from the description of the present invention.

In the specification of the present invention, the description of the embodiments of the present invention is focused mainly on data transmission and reception relation between the transmission adaptor and the reception adaptor.

According to the embodiments of the present invention, the term Downstream refers to a logical data or stream flow being transmitted from a device providing contents to a device receiving the transmitted contents. Herein, the term Downstream may be used as the synonym of the term Downlink. Additionally, the term Upstream refers to a logical data or stream flow transmitted in a direction opposite to that of the term Downstream. Herein, the term Upstream may be used as the synonym of the term Uplink.

Furthermore, a Source Device refers to a device providing contents, such as a BDP (Blu-ray Disc Player), a DVR (Digital Video Recorder), a computer, an XBOX, a laptop computer, and so on. And, a Sink Device refers to diverse types of display devices that can realize the contents, such as a Home Theater system, a Television receiver, a monitor, and so on.

The embodiments of the present invention may be supported by HDBaseT standard documents (most particularly, HDBaseT Specification Draft Version 1.0 and/or version 1.4). More specifically, reference may be made to the above-described documents for non-described steps or parts, among the embodiments of the present invention, that are apparent to those skilled in the art. Furthermore, all terms disclosed in the specification of the present invention may be described by the above-mentioned standard document.

Hereinafter, the preferred embodiments of the present invention will be described in detail with reference to the accompanying drawings. The detailed description of the present invention that is disclosed as follows with reference to the accompanying drawings is merely the description of exemplary embodiments of the present invention. And, therefore, the description of the present invention does not seek to represent a unique embodiment of the present invention.

The specific terms used in the following embodiments of the present invention are provided to facilitate the understanding of the present invention. And, therefore, without deviating from the technical scope and spirit of the present invention, such specific terms may also be varied and/or replaced by other terms.

I. HDBaseT Network

An object of the HDBaseT network is to provide a parallel network between real-time data streams, such as HDMI 1.4 streams, S/PDIF (Sony/Philips Digital Interconnect Format) streams, and USB (Universal Serial Bus) streams, and Ethernet data, user-premises configuration, and high-end networking.

Additionally, another object of the HDBaseT network is to provide a network that can support conventional devices/interface (i.e., legacy devices), such as HDMI, Ethernet, USB, and S/PDIF, and a network configured to support core network services that are to be developed in the future. (Herein, the S/PDIF corresponds to a standard for transmitting digital audio signals, and the S/PDIF originates from AES/EBU.)

HDBaseT Link operates to support four UTP (Un-shield Twisted Pair)/STP (Shielded Twist Pair) CAT5e/6/6a cables including two middle RJ45 connectors, 100 m and Peer-To-Peer (PTP).

A downstream sublink may support 8 Gbps, 500 Msymboles/sec, PAM 16 symbols, and an upstream sublink may support 300 Mbps, 25 Msymboles/sec, PAM 16 symbols. Furthermore, herein, bi-directional common usage (or shared) 200 Mbps between USB 1.0/2.0, S/PDIF, IR(Infra-Red), and UART (Universal Asynchronous Receiver/Transmitter) is supported, and bi-directional Ethernet 100 Mbps is also supported.

HDBaseT may simultaneously support multi streams within a single link. Herein, the HDBaseT may support at least 8 HDMI 1.4 downstreams, 12 USB or S/PDIF bi-directional streams, 8 IRs, and 8 UART bi-directional streams.

Figure 1:
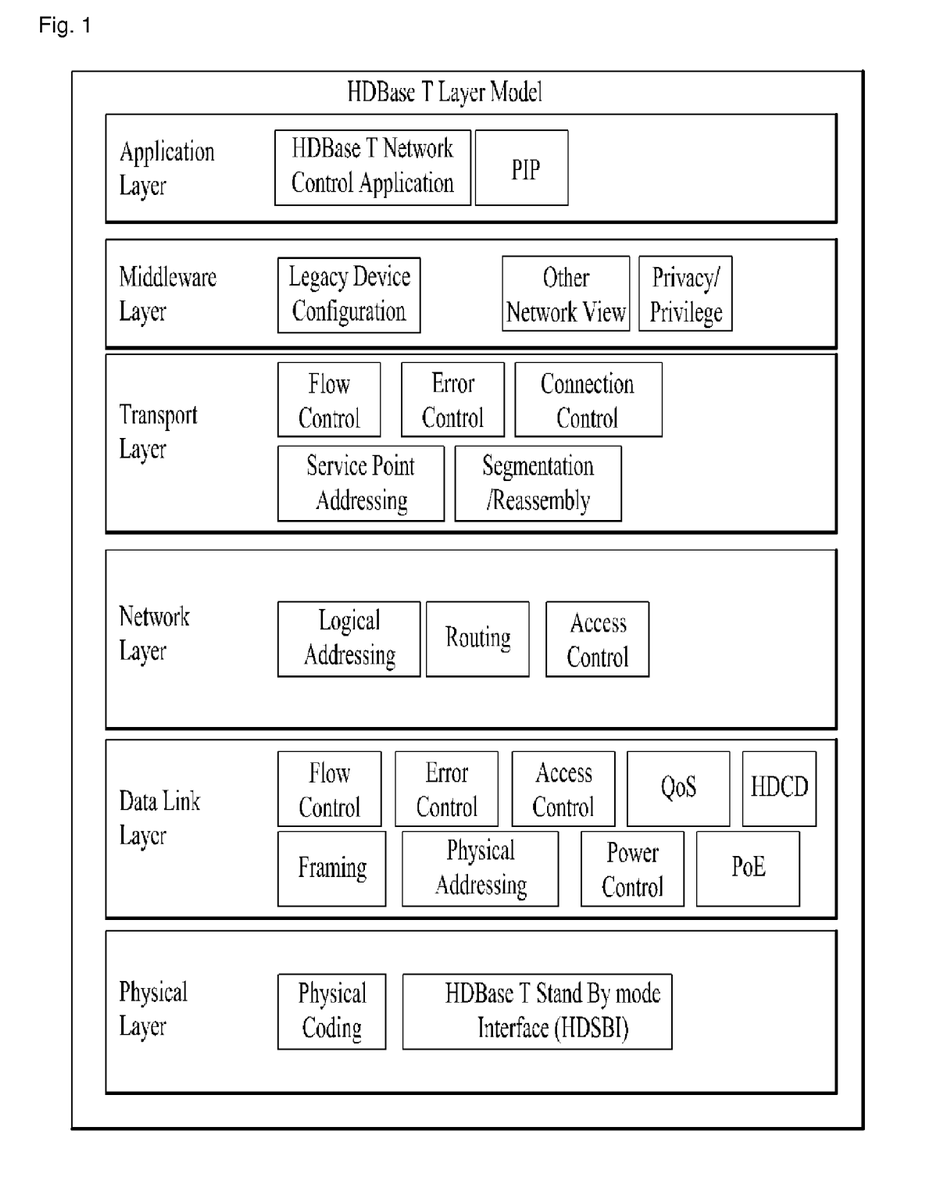
FIG. 1 illustrates an exemplary layer structure model of an HDBaseT network used in the embodiments of the present invention.

FIG. 1 illustrates an exemplary layer structure model of an HDBaseT network used in the embodiments of the present invention.

The HDBaseT network is based upon an OSI (Open System Interconnection) reference model. However, since the embodiments of the present invention are applied to the HDBaseT technology, FIG. 1 shows a new type of network layer structure, wherein the HDBaseT technology is combined with the OSI reference model.

Referring to FIG. 1, the HDBaseT network consists of a Physical Layer as the first layer (L1), a Data Link Layer as the second layer (L2), a Network Layer as the third layer, a Transport Layer as the fourth layer, a Middleware Layer as the fifth layer, and an Application Layer as the sixth layer.

At this point, the functions provided by the first layer include a Physical Coding function for transmitting a T-stream, a HDSBI (HDBaseT Stand By mode Interface) function, and so on.

The functions provided by the second layer include a Flow Control function, an Error Control function, an Access Control function, a QoS (Quality of Service) function, an HDCD (HDBaseT Configuration Database) function providing information on the configuration of an HDBaseT device, a Framing function, a Physical Addressing function, a Power Control function, a power controlling function via Ethernet (i.e., PoE (Power over Ethernet)) function.

The functions provided by the third layer include a Logical Addressing function, a Routing function for transmitting optimized data, an Access Control functions, and so on.

The functions provided by the fourth layer include a Flow Control function, an Error Control function, a Connection Control function, a Service Point Addressing function, a Segmentation/Reassembly function supporting the segmentation and assembly of upper level data, and so on.

The functions provided by the fifth layer include a Legacy Device Configuration function providing information on a legacy device for supporting the legacy device, a function for communicating with other networks (i.e., Other Network View function), a function for deciding privacy levels for protecting data and priority levels of data (i.e., Privacy/Privilege function), and so on.

The functions provided by the sixth layer include an HDBaseT Network Control Application function for controlling the communication through the HDBaseT network, and a function of showing (or displaying) a multi-streamed moving picture by using a PIP (Picture in Picture) method.

The HDBaseT devices used in the embodiment of the present invention may transmit and receive data and streams based upon the layer model structure of FIG. 1.

II. HDBaseT Adaptor (T-Adaptor)

The HDBaseT Adaptor (hereinafter referred to as a T-Adaptor) converts diverse types of protocol/interface/application data formats to HDBaseT data formats, and vice versa. The T-Adaptor uses a T-network (a network used by the HDBaseT) for performing communication with other T-Adaptors, and a target T-Adaptor may recover a converted HDBaseT system stream (hereinafter referred to as a T-stream) to the initial format.

Figure 2:
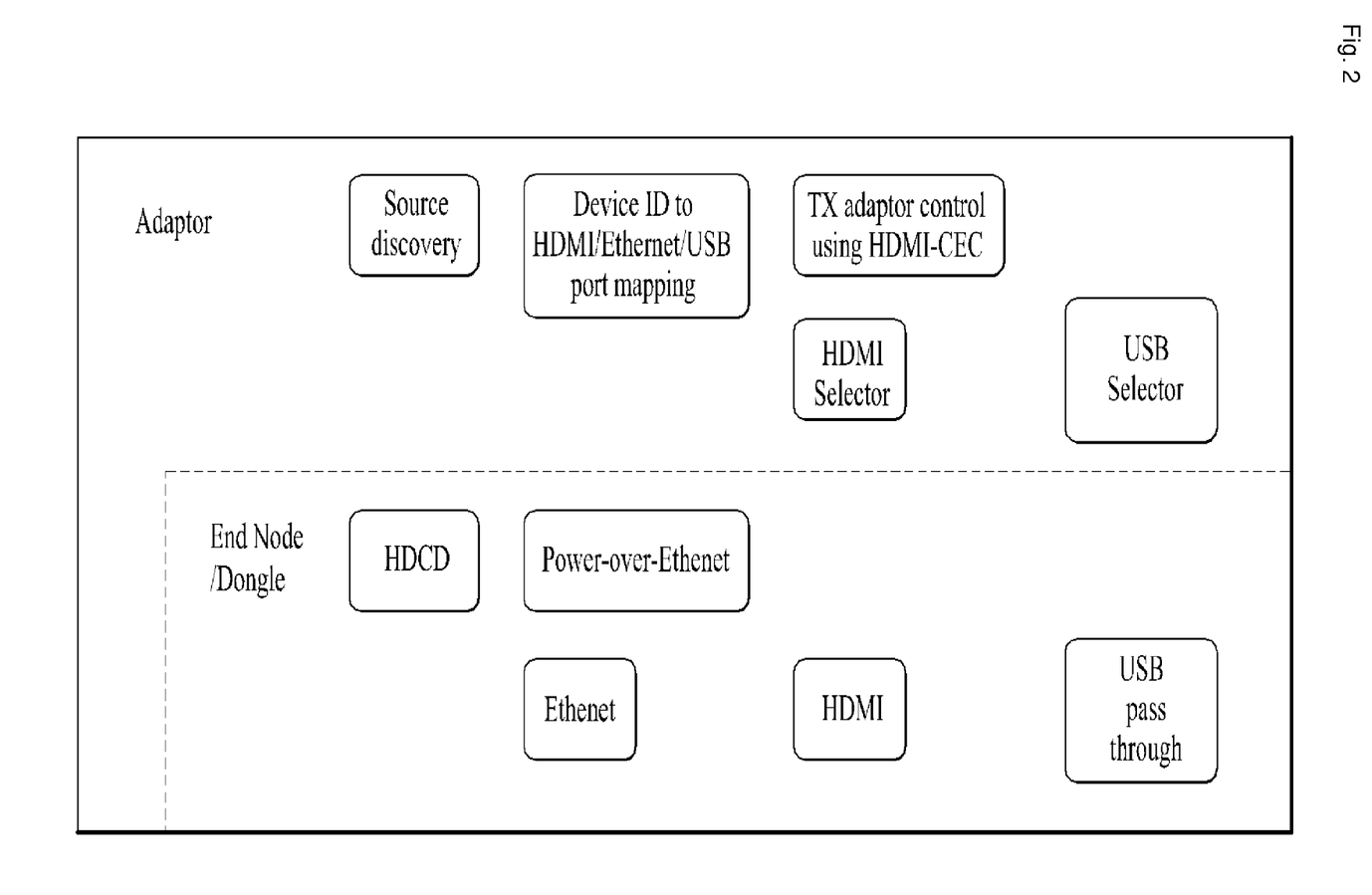
FIG. 2 illustrates the structure and functions of an HDBaseT adaptor used in the embodiments of the present invention.

FIG. 2 illustrates the structure and functions of an HDBaseT adaptor used in the embodiments of the present invention.

A T-Adaptor used in the HDBaseT system may include at least one of an end node (e.g., a Dongle), an HDMI selector, and a USB Selector.

Referring to FIG. 2, the T-Adaptor includes end nodes (e.g., Dongles), and the functions of the T-Adaptor includes a Source Discovery function, a device identifier mapping function (i.e., a Device ID to HDMI/Ethernet/USB ports mapping function), a Tx Adaptor control function using HDMI-CEC, an HDMI Selector, a USB Selector, and so on. Also, the end node included in the T-Adaptor may support an HDCD (HDBaseT Configuration Database), a Power over Ethernet function, an Ethernet port, an HDMI port, and a USB (1.0/2.0/4.0) port.

The T-Adaptor may include at least one or more HDMI input ports. The T-Adaptor may use an HDMI switching technique so as to connect HDMI data from a Source Device to Sink Device, which is connected to another T-Adaptor (i.e., an Rx Adaptor). At this point, the HDMI Selector may select one or more HDMI input ports based upon a control of an HDMI-CEC (Consumer Electronics Control) interface according to user settings. This will be referred to as HDMI selection.

Furthermore, the T-Adaptor may include one or more USB ports. Depending upon the user settings, the T-Adaptor may select one of the USB ports, and this process may be performed by the USB selector included in the T-Adaptor.

A single stream T-Adaptor supports a peer to peer connection with another adaptor within the HDBaseT network. By supporting the Legacy Network, such as Ethernet, USB, and CEC, the T-Adaptor may enable a CP (Control Point) to use the Legacy Network and may enable the HDMI switch to be controlled.

The main functions of the T-Adaptor that is used in the HDBaseT system include HDMI switching, a Source Discovery function for finding a source device connected to the HDMI port and/or USB port of the T-Adaptor, a Port Mapping function for selecting a USB port based upon the HDMI port selection, and so on.

The Source Discovery function refers to a function enabling the T-Adaptor to discover which source device is actually connected (or fixed) to the port included in the T-Adaptor itself. The T-Adaptor is unaware of the actual device name of the device that is connected to the HDMI port, Ethernet port, and USB port. The device name is directly (or personally) allocated (or assigned) by the user. In order to acquire and set up the actual device name from an HDCD (HDBaseT Configuration Database) device entity, the T-Adaptor may use HLIC (HDBaseT Link Internal Controls) acquisition/set up processing procedures (e.g., HLIC Get Transaction/HLIC Set Transaction) including a Device Description String.

The port mapping function refers to a function of mapping a Device Identifier to an HDMI port, an Ethernet port, and/or a USB port. Based upon the selection of a source device identifier, the T-Adaptor may select the corresponding HDMI/Ethernet/USB ports as a port group. A USB Hub may be included in a reception T-Adaptor attached (or connected) to the USB port.

Figure 3:
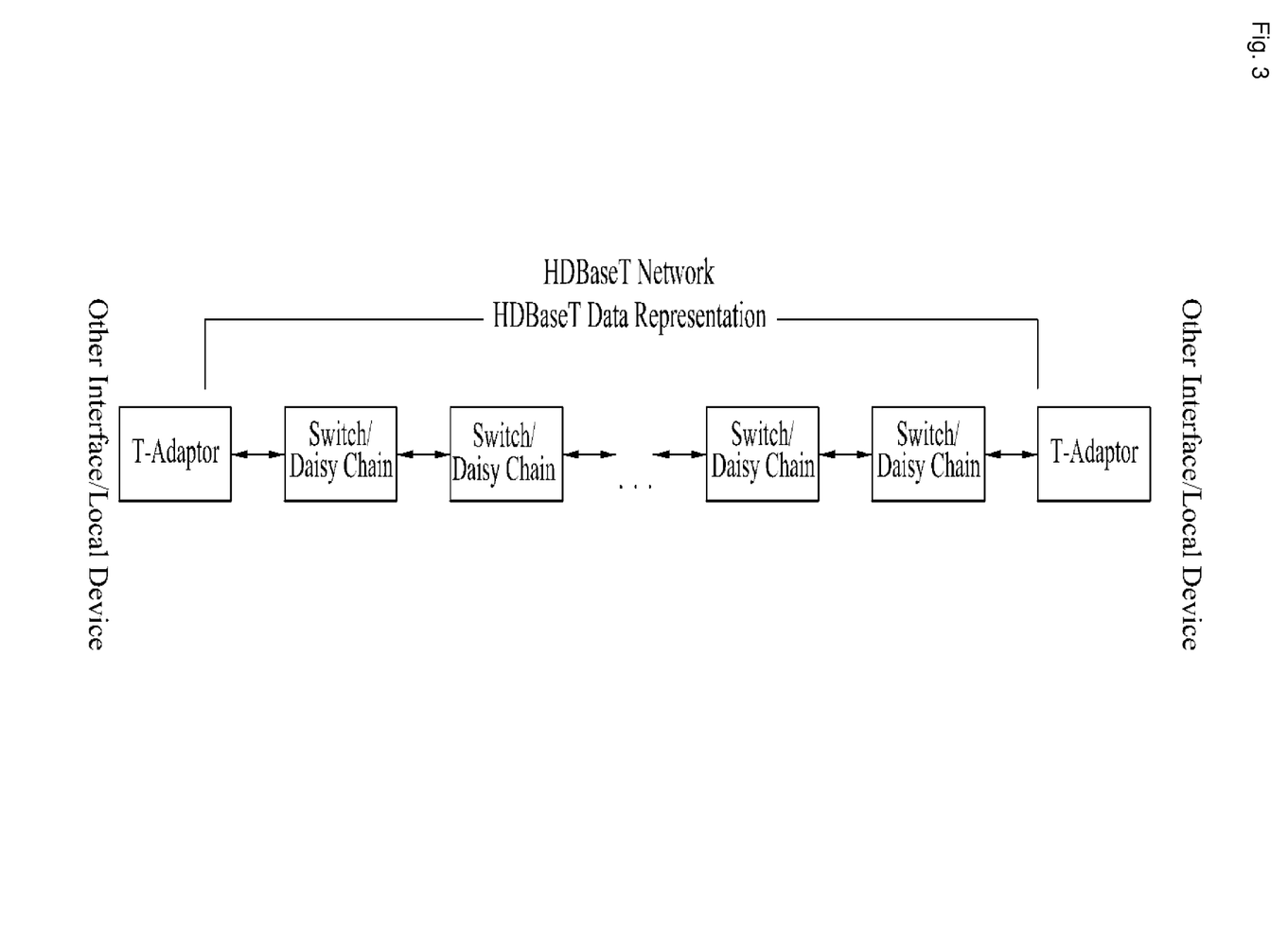
FIG. 3 illustrates an exemplary HDBaseT network (T network) used in the embodiments of the present invention.

FIG. 3 illustrates an exemplary HDBaseT network (T network) used in the embodiments of the present invention.

In order to support Ethernet services and real-time communication streams, the HDBaseT Network (hereinafter, T Network) may provide predictable and stable services with high efficiency and low delay. The T-Adaptor may provide adequate HDBaseT services through a Switch Device and through a connection group of Daisy Chain Devices, which support the serial connection method. For example, in accordance with the requirements of a native Protocol/Interface/Application, the T-Adaptor may select the adequate T-service through the Switch Device and the Daisy Chain Device. At this point, the Switch Devices and the Daisy Chain Devices are not required to be informed of the T-Adaptor type and the message processing method.

The T-Network corresponds to a region to which an HDBaseT stream that is converted from the T-Adaptor is transmitted. Herein, the T-Network refers to a communication region from the source T-Adaptor to a sink T-Adaptor. In a DS (DownStream), the T-Adaptor is used as a transmission adaptor (Tx Adaptor), and in a US (UpStream), the T-Adaptor is used as a reception adaptor (Rx Adaptor). At this point, the Tx Adaptor may be identically used as the Source Adaptor, and the Rx Adaptor may be identically used as the Sink Adaptor. More specifically, depending upon the transmission format of a stream, a T-Adaptor may perform the function of a Tx Adaptor and the function of an Rx Adaptor.

In order to perform communication between T-Adaptors within the T-Network, a Session is imperatively required to be configured. A session defines the path of a communication network and carries the adequate services. Each activated session is identified by an SID token (i.e., a Session ID or Stream ID) accompanied in each HDBaseT. The switches included in the network path switches packets based upon the SID tokens. By enabling the usage of small packets in the HDBaseT, the usage of an SID token may minimize a packet address overhead.

The HDBaseT-Stream (hereinafter, T-Stream) refers to a group of HDBaseT packet streams corresponding to information belonging to a native session. Each of the packets belonging to a T-Stream includes the same SID tokens. The T-Stream may optionally include different types of packets.

III. Method for Identifying an HDBaseT Entity

In the above, description diverse HDBaseT devices and entities used in the HDBaseT Network have been described. However, a description as to how a T-stream is transmitted through multiple devices and entities and through multiple ports, when transmitting a T-Stream within the T-Network, has not been clearly made. Also, a description as to how the respective data or services are identified in accordance with the provided data and/or services, even when the data and/or services are transmitted to the same devices, has not yet been clearly made. Accordingly, hereinafter, a method for referring to and identifying HDBaseT entities within the HDBaseT Network will now be described in detail.

Figure 4:
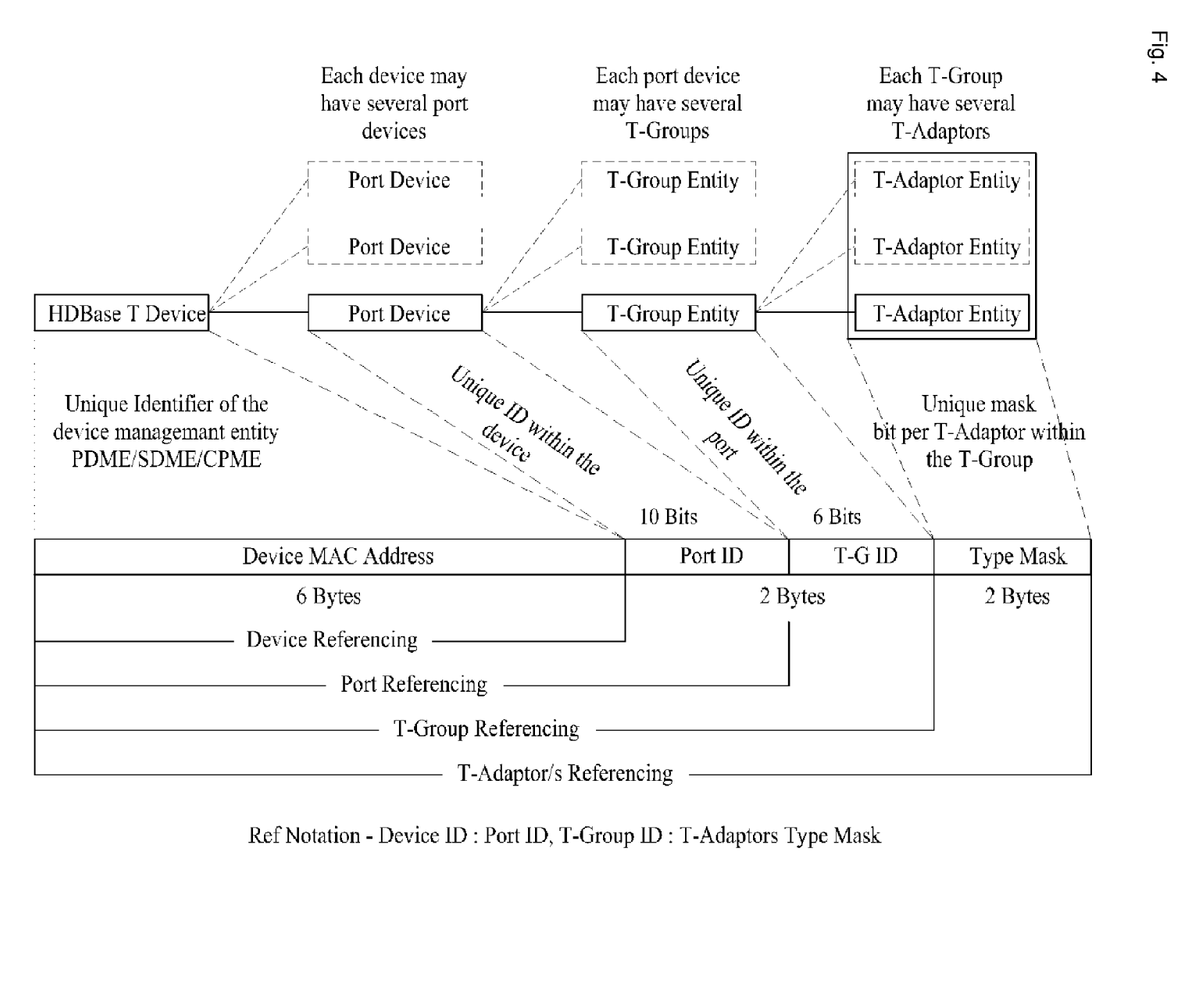
FIG. 4 illustrates a 4-level hierarchical reference method and an identifier structure, which are used for identifying HDBaseT entities as an embodiment of the present invention.

FIG. 4 illustrates a 4-level hierarchical reference method and an identifier structure, which are used for identifying HDBaseT entities as an embodiment of the present invention.

Referring to FIG. 4, one HDBaseT device may have one or more Port Devices. And, each Port Device may have one or more T-Groups (HDBaseT Group). Also, each T-Group may have one or more T-Adaptors. Hereinafter, a 4-level hierarchical reference method for identifying various entities within the HDBaseT Network will now be described in detail.

The 4-level hierarchical reference method may be performed by using a Device MAC Address for identifying management (or control) entities (i.e., Port Device Management Entity (PDME), Switch Device Management Entity (SDME), Control Point Management Entity (CPME)) that are included in an HDBaseT Device, a Port Identifier (Port ID) for identifying each port, a T-G Identifier (T-G ID) for identifying each T-Group, and a Type Mask being a unique mask for identifying each T-Adaptor.

In the embodiments of the present invention, a Device Identifier (Device ID) is used for identifying the HDBaseT Device. At this point, an Ethernet MAC Address may be used as the Device ID, and this may be referred to as the Device MAC Address. The Device MAC Address corresponds to a unique identifier for identifying management (or control) entities included in the corresponding HDBaseT Device.

It is preferable that the PDME, SDME, and CPME support Ethernet Termination. And, in case the PDME is used as the Ethernet Termination, the Ethernet MAC Address may be used as the unique identifier. However, in case the PDME is not used as the Ethernet Termination, it is preferable that the PDME uses an HLIC (HDBaseT Link Internal Controls) processing procedure so as to communicate with its link partner, the SDME. Also, by deducing (or deriving) the Device ID of the SDME, the PDME may borrow (or adopt) the identifier of the SDME. Furthermore, the PDME may use the SDME MAC Address as the Device ID of the PDME and may also use the Port Index of the SDME as the Port Index of the PDME. The Link Partner SDME shall deliver all control (or management) processing procedures to the PDME. If the link partner does not correspond to a switch of a direct point (i.e., peer to peer), the PDME cannot have a unique identifier.

Port Referencing (Device ID: Port ID) is required for uniquely identifying the PDME. In the embodiments of the present invention, by using the Ethernet MAC Address as the Device ID, a Linkage between the T-Network and an E-Network may be configured, and the management (or control) of the T-Network and sessions using Ethernet communication may this be performed.

Referring to FIG. 4, it is apparent that a Port Identifier (ID) field is used for identifying a Port Device, and that a T-G Identifier (ID) field is used for identifying a T-Group. At this point, the Port ID field and the T-Group field may be collectively used, both fields configuring a total size of 2 bytes (each field being configured of 10 bits and 6 bits). At this point, both the Port ID and the T-G ID may be referred to as a TPG Identifier (ID) (or a Group Port ID).

The 2 bytes of the TPG ID field may accompany a 10-bit index of the Port Device and 6-bit T-Group index within the Port Device. The Port Indexes ranging from 1 to 1023, each having a value other than 0, provide a unique reference for the Port Device within the HDBaseT Device. Also, the T-Group indexes ranging from 1 to 63, each having a value other than 0, provide a unique reference for a specific T-Group within the Port Device.

In the TPG ID, when the T-Group Index is equal to 0, the TPG ID provides a unique reference for a port within the HDBaseT and may be referred to as the Port ID. In case the Port ID is equal to 0, the TPG ID cannot provide any significant value.

Referring to FIG. 4, it can be known that a type mask field is used for identifying the T-Adaptor. Each T-Group may have one or more T-Adaptor type mask field indicating the T-Adaptor type associated to the corresponding group. The basic type mask field corresponds to a 16-bit sized field, and each bit indicates a specific type of a T-Adaptor associated with the corresponding T-Group.

Table 1 shown below indicates exemplary bit indexes of a type mask field corresponding to each T-Adaptor type.

TABLE 1

| Bit Index | T-Adaptor Type |
|---|---|
| 0 | HDMI Source |
| 1 | HDMI Sink |
| 2 | Reserved |
| 3 | Reserved |
| 4 | USB Host |
| 5 | USB Device/Hub |
| 6 | Reserved |
| 7 | Reserved |
| 8 | S/PDIF Source |
| 9 | S/PDIF Sink |
| 10 | Reserved |
| 11 | Reserved |
| 12 | IR Tx |
| 13 | IR Rx |
| 14 | UART |
| 15 | Extension Bit |

Referring to Table 1, Bit Indexes 0 and 1 respectively indicate an HDMI Source

Device and a Sink Device. Bit Indexes 4 and 5 respectively indicate a USB Host and a USB Device/Hub. Bit Indexes 8 and 9 respectively indicate an S/PDIF Source and a Sink. Furthermore, Bit Indexes 12 and 13 respectively indicate an IR Transmission end (Infra-Red Tx) and an IR Reception end (Infra-Red Rx), and Bit Index 14 indicates a UART (Universal Asynchronous Receiver/Transmitter).

If Bit Index 15 (b15) is set up, this indicates that an additional extension field of 16 bits is additionally used in order to indicate the T-Adaptor type. Herein, the HDBaseT Device does not assume that Index 15 is always set to 0. Also, the HDBaseT Device may support up to 3 extension fields. For example, the HDBaseT Device may support a Type Mask field of up to 64 bits.

Each T-Group cannot be associated with multiple instances of a specific T-Adaptor type. Therefore, the Type Mask field may uniquely identify only the specific T-adaptor instance within the T-Group. Also, by using the type mask reference according to the present invention, one or a plurality of T-Adaptor instances may be referred to by the T-Adaptor group associated with the T-Group.

FIG. 4 discloses a hierarchical reference method for identifying a T-Adaptor by using 10 bytes. More specifically, when a T-stream is transmitted from a Source T-Adaptor to a Sink T-Adaptor, a message (or stream) including a 10-byte Source T-Adaptor identifier and a 10-byte Sink T-Adaptor identifier may be transmitted.

Furthermore, in case signals or messages are transmitted and received within a specific HDBaseT Device, adjustments may be made for each field. For example, an 8-byte Source identifier (e.g., a 6-byte Device Identifier+a 2-byte TPG Identifier) and an 8-byte Sink Identifier may be used in an HD-CMP message, which is used in a communication between a PDME of an HDBaseT end node and an SDME of an HDBaseT switch.

In the embodiments of the present invention, the Type Mask is used to distinguish the interface of the port. For example, in case an HDMI, an IR, and a USB interfaces are included in a T-Group Port Identifier, the Type Mask is used for distinguishing each interface. Also, the Type Mask may also be used in a case where a specific interface is designated within the T-Group Port Identifier when forming a session. For example, when a session is formed between two ports by using HD-CMP messages, the Type Mask may also be used when indicating the Source and Sink within the HD-CMP messages.

Figure 5:
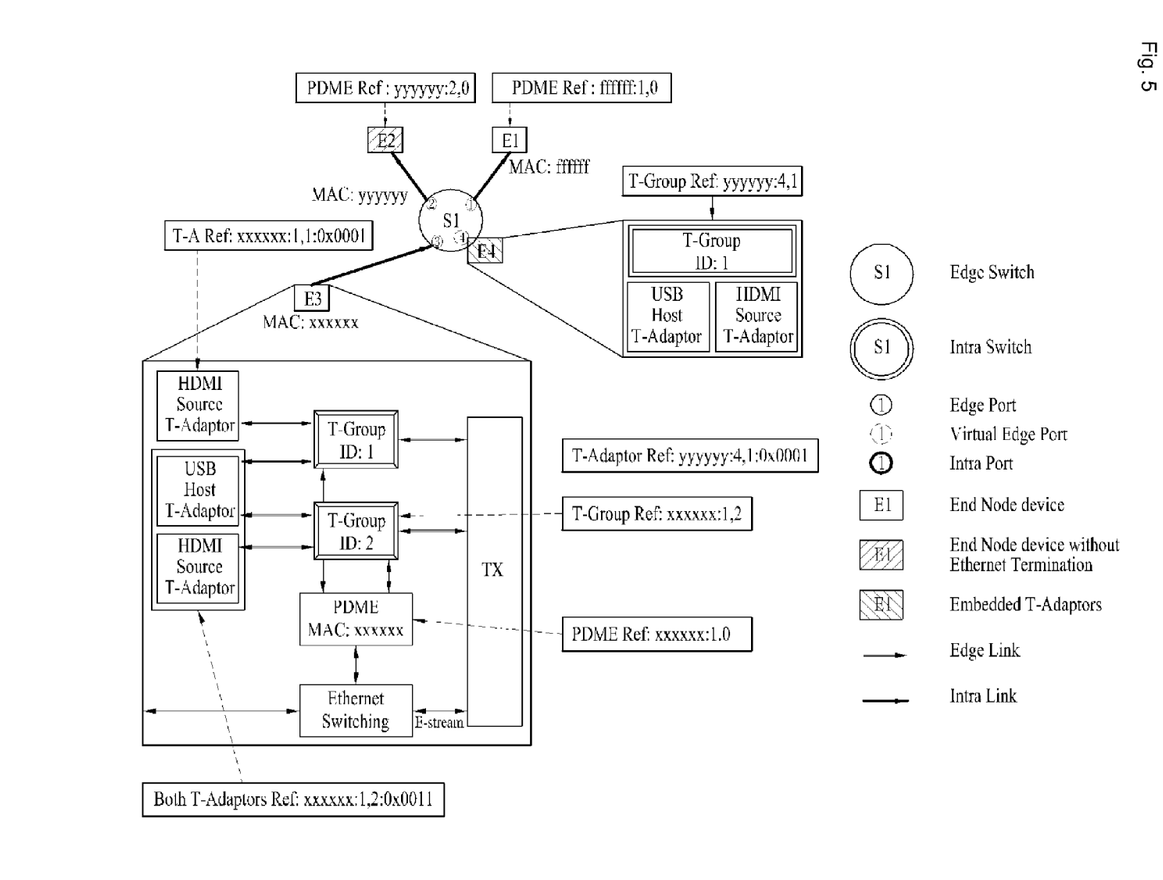
FIG. 5 illustrates an exemplary reference method according to an embodiment of the present invention.

FIG. 5 illustrates an exemplary reference method according to an embodiment of the present invention.

Referring to FIG. 5, Edge Switch 1 includes Edge Ports 1, 2, and 3, and Virtual Edge Port 4. Edge Port 1 is connected to End node Device 1 (E1) by an Edge link. Edge Port 2 is connected to End node Device 2 (E2), which has no Ethernet Termination, by an Edge link. Edge Port 3 is connected to End node Device 3 (E3) by an Edge link. Furthermore, Virtual Edge Port 4 is connected to an embedded T-Adaptor (E4).

In FIG. 5, in order to identify an HDBaseT entity (e.g., HDMI Source, USB Host, and so on), a 4-layer identifier may be used. For example, as a 4-layer identifier, in Ref: aaaaaa: b,c:0x0001, the MAC Address is aaaaaa, the T-Group Identifier (TPG) field is 1 and 2 (i.e. TPG ID=b, c), and the Type Mask is used to identify the HDBaseT entity (e.g. T-adapter) of 0x0001. Hereinafter, FIG. 5 will be described based upon the above-described details.

Referring to FIG. 5, the MAC address of End node Device 1 is 'ffffff', and the MAC address of End node Device 2 is 'yyyyyy', and the MAC address of End node Device 3 is 'xxxxxx', and the MAC address of the embedded T-Adaptor is 'yyyyyy'.

End node Device 3 (E3) is one of HDBaseT Devices. End node Device 3 includes one or more HDMI Source T-Adaptors and USB Host T-Adaptors as the link entities. Also, End node Device 3 includes a Port Device Management Entity (PDME) using the same MAC Addresses as the MAC Address of a T-Group Entity having the T-Group ID of 1, a T-Group Entity having the T-Group ID of 2, an Ethernet Switching Entity, and a End node Device. Furthermore, End node Device 3 may further include a transmitting end (Tx or Transmitting module) as the Physical Entity.

Figure 6:
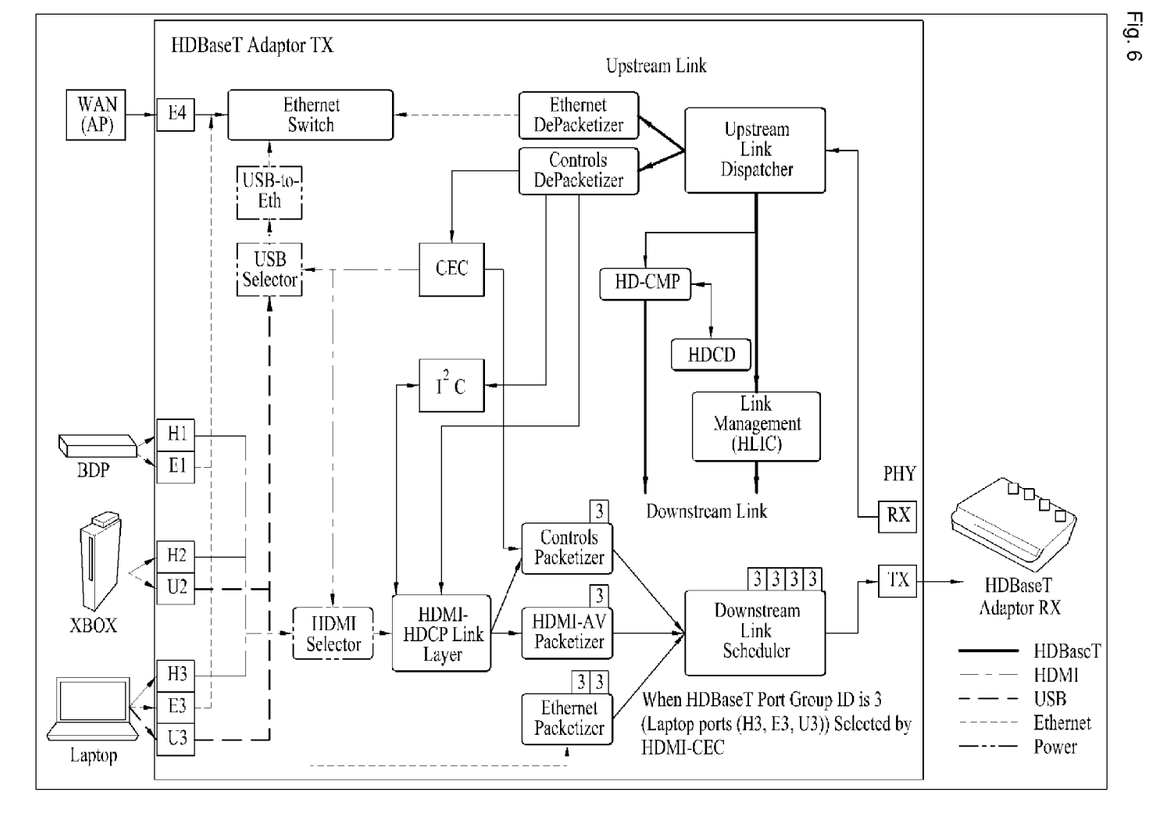
FIG. 6 illustrates an exemplary transmission adaptor (Tx Adaptor) and an exemplary hierarchical reference method as an embodiment of the present invention.

FIG. 6 illustrates an exemplary transmission adaptor (Tx Adaptor) and an exemplary hierarchical reference method as an embodiment of the present invention.

Hereinafter, the description of the present invention will be mainly focused on the DownStream transmission so that the description can be focused on the functions of the Tx Adaptor. Referring to FIG. 6, as an example of the T-Adaptor, the transmission adaptor may deliver (or transport) multimedia contents of the Source Device, such as a Blu-ray Disc player (BDP), an XBOX, and/or a Laptop, to a target device, i.e., the Sink Device.

The HDMI data (H1, H2, H3) that are received from each Source Device are inputted to the HDMI selector. The HDMI selector delivers the received data to an HDMI HDCP Link Layer, and the HDMI HDCP Link Layer transmits the received data to a Control Packetizer, which converts control data to a control stream, and also transmits the received data to an HDMI-AV Packetizer, which converts the HDMI data to an HDMI T-Stream.

Also, the USB data (U2, U3) that are received from each Source Device are inputted to the USB selector. Thereafter, the received USB data may be converted to Ethernet T-Streams based upon the selection of the USB selector.

Furthermore, the Ethernet data (E1, E3, E4) that are received from each Source Device are inputted to the Ethernet Switch. And, the Ethernet Switch inputs the received Ethernet data to an Ethernet Packetizer. The Ethernet Packetizer converts the Ethernet data to an Ethernet T-Stream, so that the corresponding data can be transmitted within the T-Network. At this point, the Ethernet T-Stream may include the converted HDMI packets, control packets, and/or Ethernet packets.

Each of the T-Streams that are converted by the above-described Control Packetizer, HDMI-AV Packetizer, and Ethernet Packetizer is inputted to a DownStream Link Scheduler. The DownStream Link Scheduler (DS Scheduler) controls the order of the packets that are being transmitted through a DS link. The packets transmitted by the DS scheduler may be differentiated based upon the data types that are being transmitted through the HDBaseT link. For example, the packets that are controlled by the DS scheduler include HDMI-AV packets, control packets, and Ethernet packets. The DownStream link scheduler of a link layer may use a transmitting antenna (or transmitting module) of a physical layer so as to transmit the received T-Streams to the reception adaptor through the T-Network.

In addition to the entities of the above-described link layer, the Tx Adaptor of FIG. 6 may also include an Upsteam Link Dispatcher controlling an UpStream link, an Ethernet DePacketizer converting Ethernet T-Streams to native data, and a Control De-Packetizer converting Control T-Streams to control data. More specifically, the Tx Adaptor may receive control streams and/or Ethernet streams that are transmitted from the Rx Adaptor, so as to deliver the received streams to the respective Source Devices.

Also, the Tx Adaptor may also include a CEC (Consumer Electronics Controls) entity, which corresponds to an entity providing high quality control functions among all of the diverse audio and video documents, an I2C entity, which corresponds to a Multi-Master Serial Computer Bus, and an HDCD (HDBaseT Configuration Database), which includes information on the configuration and state of the Tx Adaptor.

Furthermore, the Tx Adaptor may further include an HLIC (HDBaseT Link Internal Controls) entity, which are used for accessing the HDCD that is directly attached to another HDBaseT Device, and which provides connection means for controlling the HDBaseT link, and HD-CMP (HDBaseT Control & Management Protocol) entities, which provide control and management protocols for transmitting and receiving T-Streams.

Figure 7:
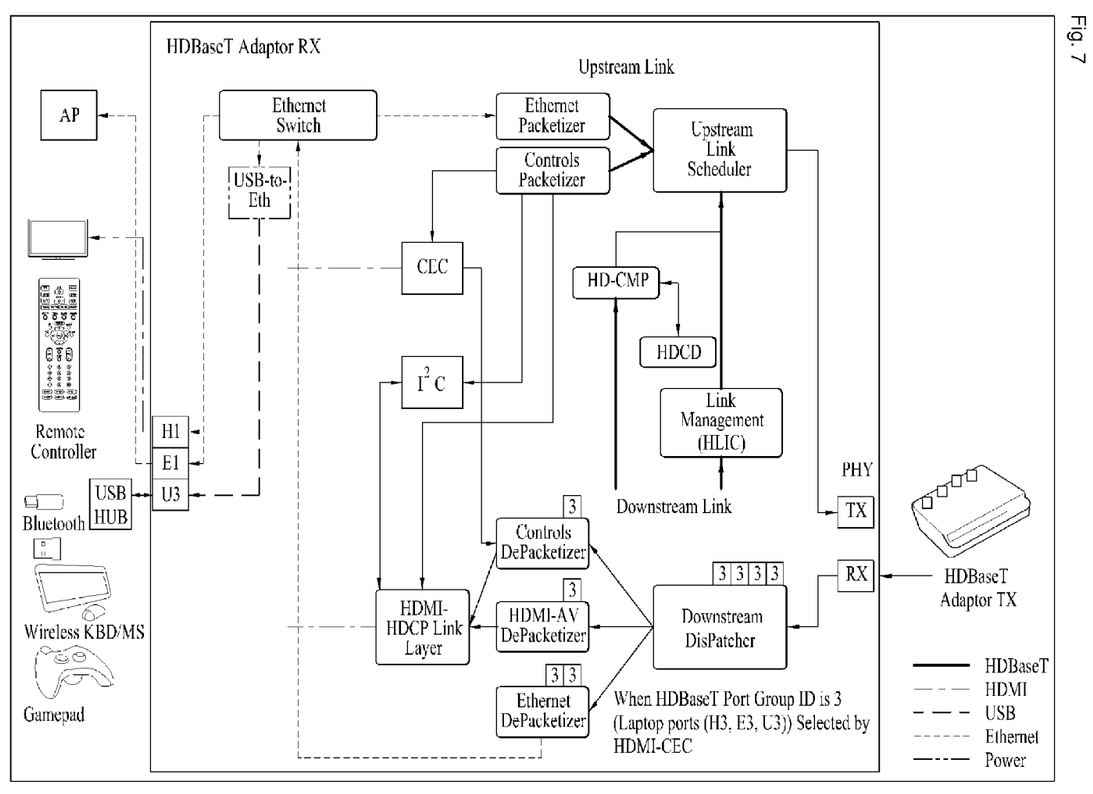
FIG. 7 illustrates an exemplary reception adaptor (Rx Adaptor) according to an embodiment of the present invention.

FIG. 7 illustrates an exemplary reception adaptor (Rx Adaptor) according to an embodiment of the present invention.

The reception adaptor (Rx Adaptor) disclosed in FIG. 7 corresponds to an entity for UpStream transmission. The description of the entities included in the Rx Adaptor is identical to the description of FIG. 6. Therefore, the following description will be mainly focused on the operations of the Rx Adaptor when transmitting Upstreams.

Referring to FIG. 7, the Rx Adaptor receives T-Streams from the Tx Adaptor. The received Downstream T-Streams are inputted to a Downstream Link DisPatcher, so as to be distributed to the Control DePacketizer, the HDMI-AV DePacketizer, and the Ethernet DePacketizer based upon the identifiers included in the corresponding T-Streams. Additionally, the Control DePacketizer, the HDMI-AV DePacketizer, and the Ethernet DePacketizer may convert each T-Stream to native data. The converted data are then inputted to the HDMI-HDCP Link Layer entity or to the Ethernet Switch, so as to be transmitted to the port of the respective Sink Devices indicated by each identifier.

Referring to FIG. 6 and FIG. 7, the Tx Adaptor and the Rx Adaptor may use the 4-layer reference method described in FIG. 4, so as to transmit and receive messages, data, or streams. Referring to FIG. 6, among the Source Devices, data transmitted from a Laptop computer are converted to T-streams by the Control Packetizer, the HDMI-AV Packetizer, and the Ethernet Packetizer. Then, the converted T-streams are combined in the Downstream Link Scheduler, thereby being transmitted to the Rx Adaptor through the transmitting end (Tx). More specifically, the Tx Adaptor may transmit Downstreams, which includes a Device Identifier of the laptop for each stream, a port identifier of the laptop, a T-Group identifier (TPG ID) assigned to the ports, and a type mask of the Tx Adaptor, to the Rx Adaptor.

Also, in FIG. 7, in order to transmit the received T-streams from a Downstream Dispatcher to a target Sink Device of the corresponding stream, the received T-streams may be distributed (or dispatched) based upon each port identifier. More specifically, the Downstream Dispatcher of the Rx Adaptor may know to which port of the Sink Device each T-stream is to be transmitted based upon the TGP ID. Therefore, the Downstream Dispatcher delivers each T-stream to the Control DePacketizer, the HDMI-AV DePacketizer, and the Ethernet DePacketizer, and each DePacketizer converts the T-streams to the initial data (i.e. HDMI data, USB data and/or Ethernet data), thereby delivering the converted data to the respective ports of the Sink Device.

Figure 8:
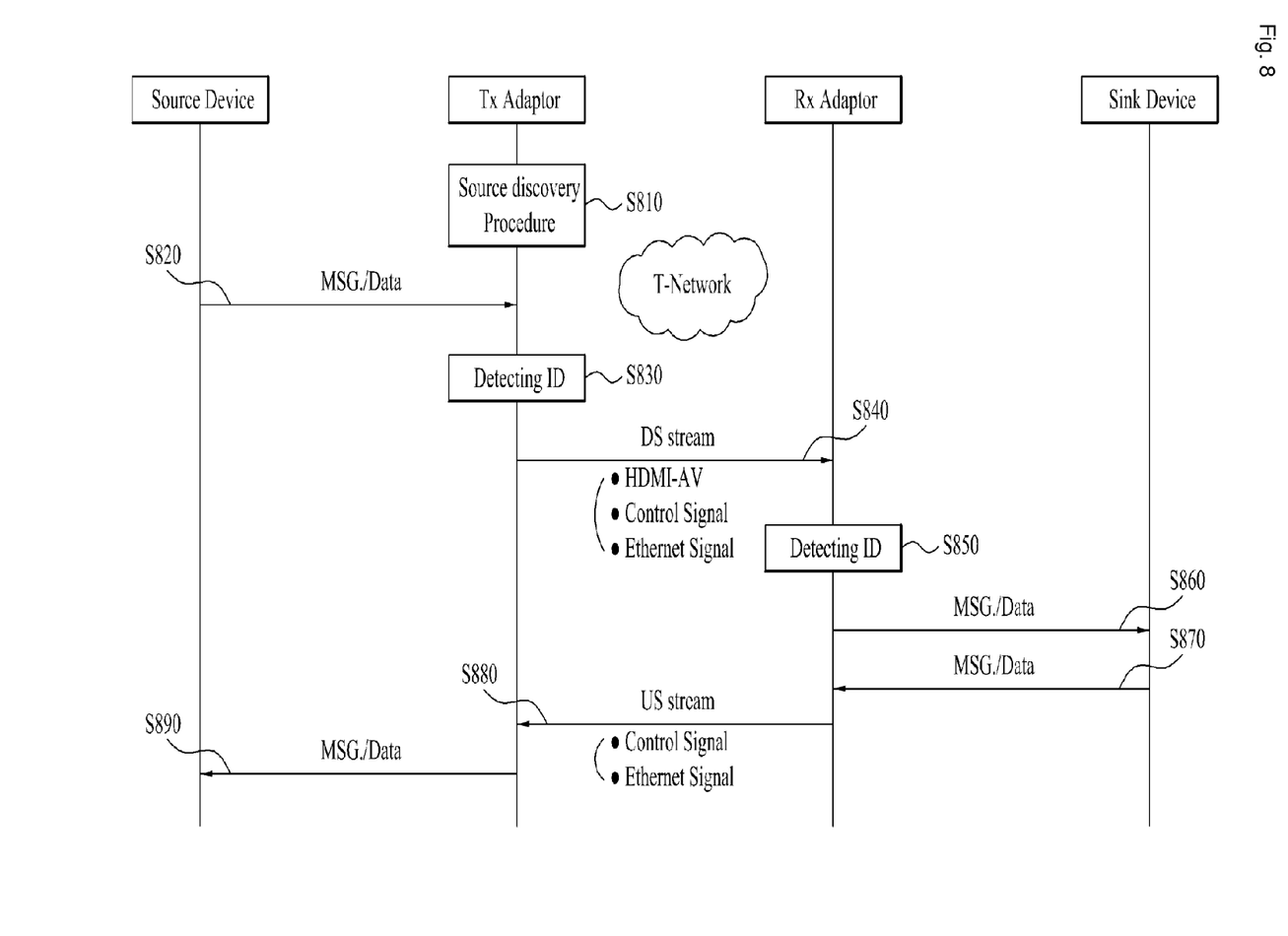
FIG. 8 illustrates an exemplary procedure performed by a T-Adaptor for selecting a device according to the embodiments of the present invention.

FIG. 8 illustrates an exemplary procedure performed by a T-Adaptor for selecting a device according to the embodiments of the present invention.

FIG. 8 describes methods performed by the T-Adaptor for selecting devices and/or entities. Also, FIG. 8 describes which information for selecting the HDMI port, Ethernet port, and USB port of the Source Device selected by the T-Adaptor is required, when the user selects one Source Devices.

Referring to FIG. 8, in order to verify which Source Device is attached to the Tx Adaptor, the Tx Adaptor performs a Source Discovery Process (S810).

In Step S810, when a periodic or event occurs, the T Adaptor may gather information on the Source Device from the HDMI-CEC interface. The T-Adaptor may acquire information on HDMI input/output, Ethernet port, and USB port from a Port Active Type field and a Port Type Capability field, which are stored in the HDCD port entities.

Table 2 shown below shows exemplary field formats of diverse port entities.

TABLE 2

| Purpose | Entity ID | Definition | Value Length (Octet) | Read/Write | Remarks |
| --- | --- | --- | --- | --- | --- |
| Port Entities | TBD | Group ID | | RW | HDMI ports, USB ports and Ethernet ports from a device should have a common group port ID |
| | 0x0402 | Port Type Capability: 0x01-End Node Source Only0x02-End Node Sink only0x03-HDMI IN only0x04-HDMI OUT only0x05-Ethernet Only0x06-USB only | | RO | HDMI IN/OUT, Ethernet, USB ports are added. |
| | 0x0403 | Port Active Type: 0x00-Reserved0x01-End Node Source Only 0x02-End Node Sink Only 0x03-HDMI IN Only0x04-HDMI OUT Only0x05-Ethernet Only0x06-USB Only (USB Host) | | RO | HDMI IN/OUT, Ethernet, USB ports are added. |
| | TBD | Port Change | | RW | Port Status Change indicator for routing, bandwidth assignment, power management, failure detection. |

TABLE 2-continued

| Purpose | Entity ID | Definition | Value Length (Octet) | Read/Write | Remarks |
|---|---|---|---|---|---|
| | TBD | MAX Bandwidth | | RO | |
| | TBD | Assigned Bandwidth | | RW | |
| | TBD | Port Status 0x00 Reserved0x01 ON0x02 OFF 0x03 Unreachable | | RW | Port Status indicator for power management, failure detection. |

Referring to Table 2, the Group Port ID (or TPG ID) consists of 2 bytes, and the HDMI port, USB port, and Ethernet port of the HDBaseT Device may have a common (or shared) Group Port ID. The Port Active Type field and the Port Type Capability field indicate which entities have been added and/or activated. The Port Change field may be used as an indicator for routing, bandwidth assignment (or allocation), power management (or control), and failure detection. The Port Status field may be used as an indicator for power management and failure detection.

Also, in Step S810, the T-Adaptor may acquire the Group Port ID from the HDCD port entities. At this point, the USB ports, Ethernet ports, and HDMI ports of the Source Device should be allocated (or assigned) with a Group Port ID, and it is preferable that the HDMI ports, USB ports, and Ethernet ports of the devices are given a Group Port ID.

The Tx Adaptor may receive data including a control message (e.g., a User Device Selection Request message) or multimedia contents from a discovered Source Device (S820).

In order to deliver the corresponding message or data from the received message or data, the T-Adaptor may detect a 4-layer identifier, which is included in the message or data (S830).

In step S830, the Tx Adaptor detects a Device ID and detects a Group ID, which is associated with the detected Device ID. Also, based upon the selected Group ID, the T-Adaptor may detect an HDMI Port ID, an Ethernet Port ID, and a USB Port ID.

By performing the above-described process, the T-Adaptor may verify the entity belonging to which T-Group and through which port the corresponding message is to be delivered. More specifically, by using 4-layer reference method and identifier shown in FIG. 4, the T-Adaptor may be capable of verifying the target to which each message is to be transmitted. For example, in case of transmitting a specific message, the T-Adaptor may attach the Type Mask of the T-Adaptor itself to the message including the Device ID, the T-Group ID, and the Port ID. Also, in case of receiving a specific message, the T-Adaptor may verify from which T-Adaptor the received message has been transmitted by referring to a Type Mask field included in the corresponding message. And, the T-Adaptor may also verify to which port of the corresponding HDBaseT Device the contents of the corresponding message are to be delivered by referring to the TPG field (i.e., T-G ID and Port ID).

Referring once again to FIG. 8, in order to transmit the message and/or data received from the Source Device within the T-Network, the Tx Adaptor converts the received message and/or data to a T-Stream, and, then, the Tx Adaptor transmits the converted Downstream T-Stream to the Rx Adaptor (S840).

The Rx Adaptor receiving the Downstream T-Stream may detect 4-layer identifiers included in the downstream (S840).

By using the identifiers detected in step S840 (see FIG. 4), the Rx Adaptor may identify the Sink Device attached to the Rx Adaptor and the Port entity for performing transmission to the Sink Device. Therefore, the Rx Adaptor may convert the Downstream to the native (or original) message and data and may deliver the converted native message and data to the target Sink Device of the Downstream (S860).

If messages or data that are to be transmitted from the Sink Device to the Source Device exist, the Sink Device delivers the corresponding messages or data to the Rx Adaptor (S870).

The Rx Adaptor may convert the messages or data to an Upstream T-Stream and may transmit the converted Upstream T-Stream to the Tx Adaptor (S880), and the Tx Adaptor receiving the upstream T-Stream may convert the received upstream T-Stream to a native message, thereby delivering the converted native message to the Source Device (S890).

In FIG. 8, the Tx Adaptor may refer to the Tx Adaptor described in FIG. 6, and the Rx Adaptor may refer to the Rx Adaptor described in FIG. 7. Also, the Downstream T-Stream may include an HDMI-AV signal, a control signal, and Ethernet signals simultaneously or separately. And, the upstream may include a control signal and Ethernet signals simultaneously or separately.

The present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

Industrial Applicability

The present invention may be applied to diverse home networks, home entertainment industries. And, most particularly, the present invention may also be applied to the HDBaseT system.

The invention claimed is:

1. A method for transmitting a packet in a high definition base transmission (hereinafter referred to as HDBaseT) system, the method comprising:
receiving, at a transmission adaptor, data from a source device;
converting, by the transmission adaptor, the received data to the packet in order to transmit the packet to a reception adaptor through an HDBaseT network; and
transmitting the packet to the reception adaptor,
wherein the packet includes a four level hierarchical identifier for identifying HDBaseT entities to which the packet is to be transmitted, and
wherein the four level hierarchical identifier includes a device medium access control (MAC) address field for identifying a device management entity of an HDBaseT device, a port identifier field for identifying a port device associated with the HDBaseT device, an HDBaseT group (T group) identifier field for identifying a T group associated with the port device, and a type mask field for identifying one or more HDBaseT adaptors (T adaptors) associated with the T group.

2. The method of claim 1, wherein the type mask field indicates at least one of a high definition multimedia interface (HDMI) source, an HDMI sink, an S/PDIF (Sony/Philips Digital Interconnect Format) source, an S/PDIF sink, a USB (Universal Serial Bus) host, a USB device, an IR TX (Infra-Red Transmitter), an IR RX (Infra-Red Receiver), a UART (Universal Asynchronous Receiver/Transmitter), and an extension bit.

3. The method of claim 2, wherein, when the extension bit is set up, the four level hierarchical identifier includes two or more type mask fields.

4. The method of claim 1, wherein the port identifier field and the T group identifier field are combined so as to identify a specific T group entity.

5. The method of claim 4, wherein, when the T group identifier field is set to '0', the combination of the port identifier and the T group identifier indicates a unique port device within the HDBaseT device.

6. The method of claim 1, wherein the device management entity corresponds to one of a port device management entity (PDME), a switching device management entity (SDME), and a control point management entity (CPME).

7. The method of claim 1, wherein the four level hierarchical identifier includes at least one of a device identifier (Device ID) for identifying a management entity of the reception adaptor, a port identifier (Port ID) for identifying a port device of the reception adaptor, an HDBaseT group identifier (T-Group ID) for identifying an HDBaseT group (T-Group) associated with the port device, and a type mask field for identifying the reception adaptor belonging to the identified T-group.

8. The method of claim 7, wherein the transmission adaptor performs a source device discovery procedure for discovering the source device.

9. The method of claim 7, wherein the port identifier field and the T group identifier field are combined so as to identify a specific T group entity.

10. A device for transmitting a packet in a high definition base transmission (HDBaseT) system, the device comprises:
a packetizer;
a transmitter (Tx); and
a receiver (Rx);
wherein the device is configured to:
receive data from a source device using the Rx;
convert the received data to the packet using the packetizer in order to transmit the converted packet to a reception adaptor through an HDBaseT network;
transmit the packet to the reception adaptor using the Tx;
the packet includes a four level hierarchical identifier for identifying HDBaseT entities to which the packet is to be transmitted, and
the four level hierarchical identifier includes a device medium access control (MAC) address field for identifying a device management entity of an HDBaseT device, a port identifier field for identifying a port device associated with the HDBaseT device, an HDBaseT group (T group) identifier field for identifying a T group associated with the port device, and a type mask field for identifying one or more HDBaseT adaptors (T adaptors) associated with the T group.

11. The device of claim 10, wherein the type mask field indicates at least one of an high definition multimedia interface (HDMI) source, an HDMI sink, an S/PDIF (Sony/Philips Digital Interconnect Format) source, an S/PDIF sink, a USB (Universal Serial Bus) host, a USB device, an IR TX (Infra-Red Transmitter), an IR RX (Infra-Red Receiver), a UART (Universal Asynchronous Receiver/Transmitter), and an extension bit.

12. The device of claim 11, wherein, when the extension bit is set up, the four level hierarchical identifier includes two or more type mask fields.

13. The device of claim 10, wherein the port identifier field and the T group identifier field are combined so as to identify a specific T group entity.

14. The device of claim 13, wherein, when the T group identifier field is set to '0', the combination of the port identifier and the T group identifier indicates a unique port device within the HDBaseT device.

15. The device of claim 10, wherein the device management entity corresponds to one of a port device management entity (PDME), a switching device management entity (SDME), and a control point management entity (CPME).

16. The device of claim 10, wherein the four level hierarchical identifier includes at least one of a device identifier (Device ID) for identifying a management entity of the reception adaptor, a port identifier (Port ID) for identifying a port device of the reception adaptor, an HDBaseT group identifier (T-Group ID) for identifying an HDBaseT group (T-Group) associated with the port device, and a type mask field for identifying the reception adaptor belonging to the identified T-group.

17. The device of claim 16, wherein the transmission adaptor performs a source device discovery procedure for discovering the source device.

18. The device of claim 16, wherein the port identifier field and the T group identifier field are combined so as to identify a specific T group entity.

* * * * *